United States Patent [19]
Suk

[11] Patent Number: 5,480,178
[45] Date of Patent: Jan. 2, 1996

[54] COMPACT GOLF PULL CART WITH ATTACHED GOLF BAG

[76] Inventor: Young J. Suk, 34 Garvies Point Rd., Glen Cove, N.Y. 11542

[21] Appl. No.: 167,171

[22] Filed: Dec. 16, 1993

[51] Int. Cl.⁶ ........................................... B62B 1/12
[52] U.S. Cl. ................. 280/646; 280/47.26; 280/DIG. 6
[58] Field of Search .................. 280/42, DIG. 6, 280/47.17, 47.24, 47.26, 646, 639; 248/96, 98

[56] References Cited

U.S. PATENT DOCUMENTS

| | | | |
|---|---|---|---|
| 1,955,463 | 4/1934 | Lathrop | 280/DIG. 6 |
| 3,985,373 | 10/1976 | Widegren | 280/47.26 |
| 4,620,682 | 11/1986 | Yim | 280/DIG. 6 |
| 4,822,071 | 4/1989 | Widegren | 280/47.26 |
| 4,832,362 | 5/1989 | Chen | 280/DIG. 6 |
| 4,911,465 | 3/1990 | Hauer | 280/646 |
| 5,147,089 | 9/1992 | Anderson | 280/DIG. 6 |

FOREIGN PATENT DOCUMENTS 2045697  11/1980  United Kingdom ............. 280/DIG. 6

Primary Examiner—Karin L. Tyson
Assistant Examiner—Carla Mattix

[57] ABSTRACT

A combination golf pull cart and golf bag in which the cart wheel-supporting legs vertically suspend, when not in an open tripod bag-supporting use, from a semi-circular bracket in encircling relation about the rear of the golf bag, which is a position forward and almost entirely within the width of the golf bag, and contributes to an optimum compact storage condition.

1 Claim, 3 Drawing Sheets

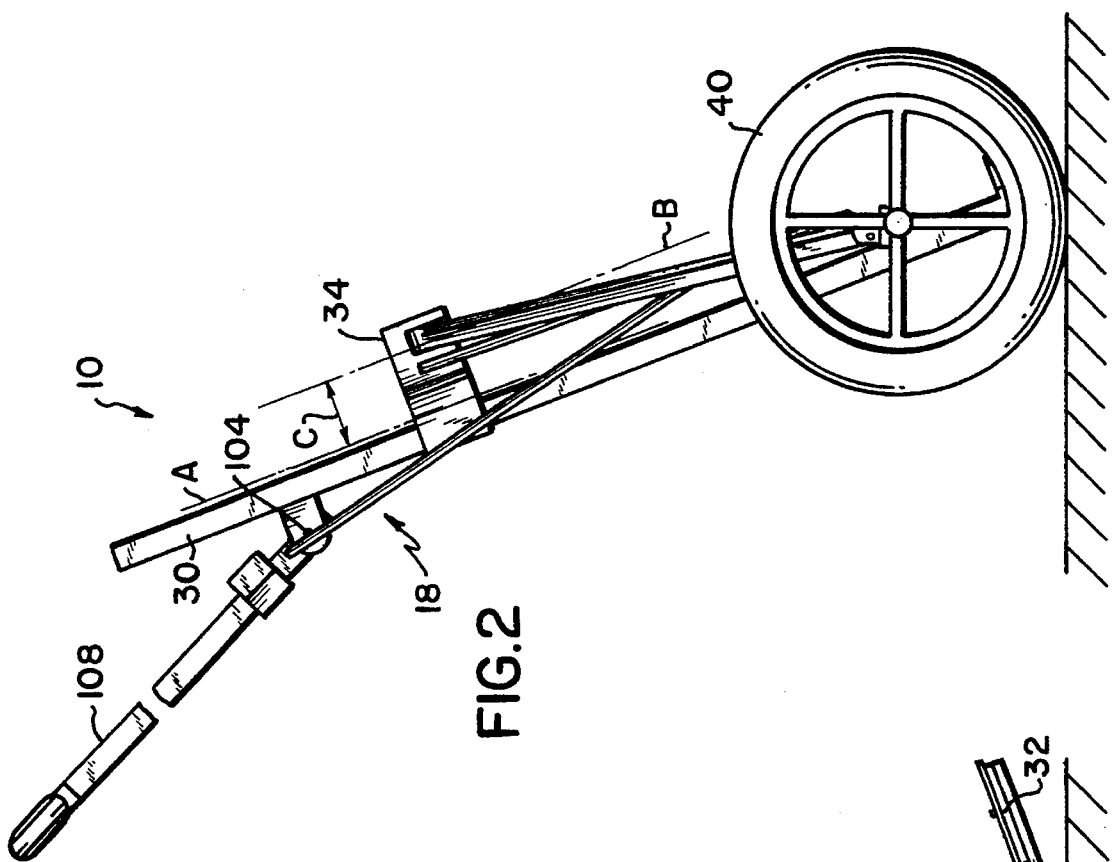
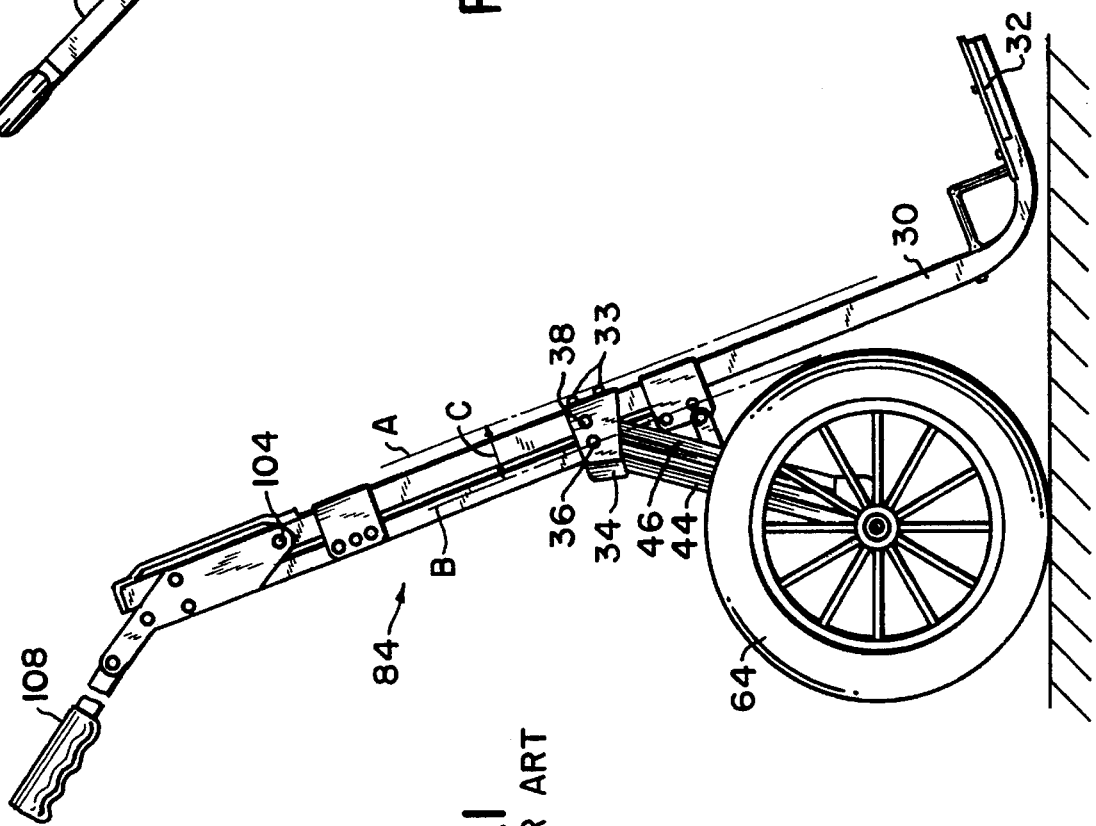
FIG. 1 PRIOR ART

FIG.3
FIG.4
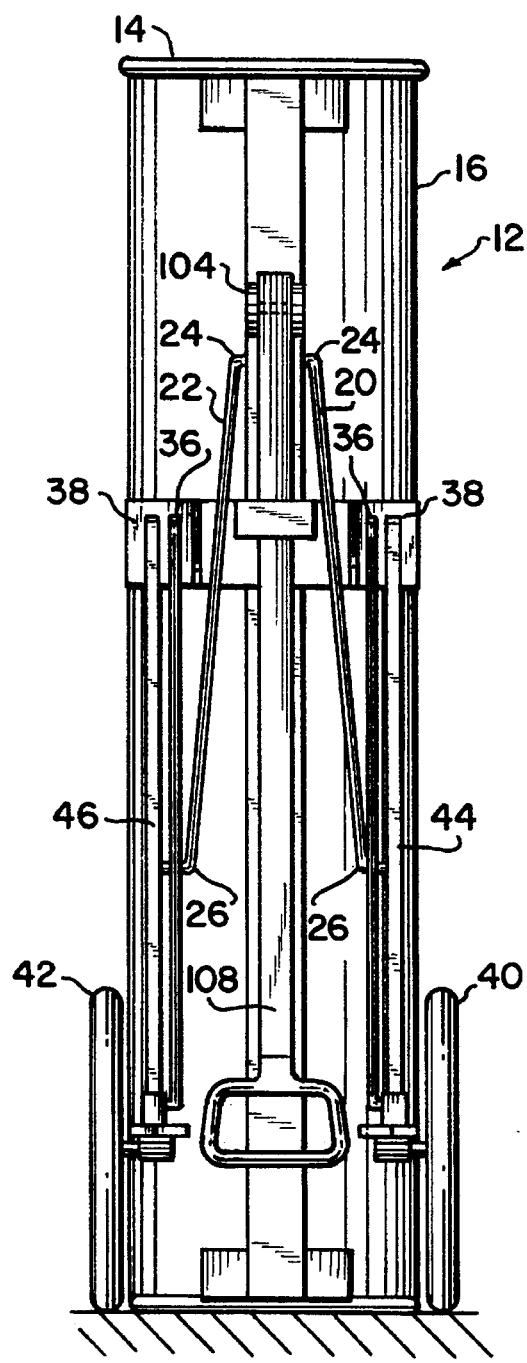
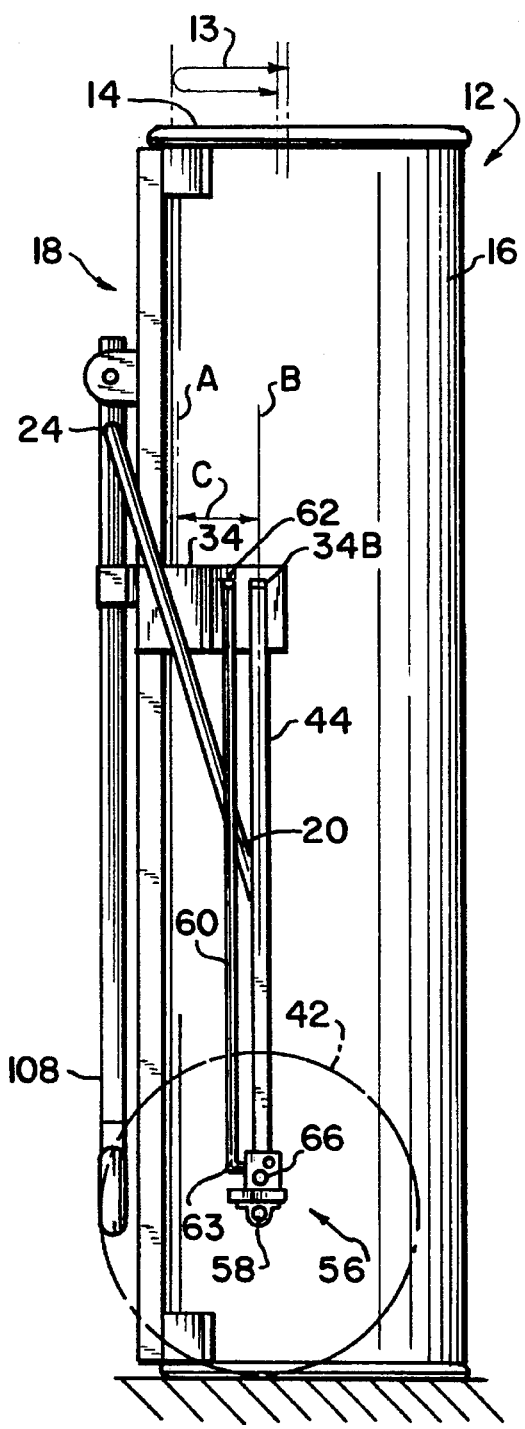

COMPACT GOLF PULL CART WITH ATTACHED GOLF BAG

The present invention relates generally to improvements for a golf pull cart with attached golf bag in which, more particularly, the improvements contribute to a storage or non-use condition of the combination golf bag and pull cart which occupies a significantly diminished space which facilitates storage, the placement and removal thereof from an auto trunk preparatory to and following golf course use, as well as providing other in-use benefits as will be better understood as the description proceeds.

EXAMPLE OF THE PRIOR ART

It is already well known to provide golf pull carts with attached golf bags for golf course use for the convenience of relieving the golfer of the weight of carrying this equipment or the expense of a motor-powered golf cart. Exemplifying the many U.S. patents illustrating and describing such golf bag pull carts is U.S. Pat. No. 3,459,434 issued to Dulaney on Aug. 5, 1969, which, as should be readily understood, includes a practical requirement, namely wheel-supporting legs which in conjunction with the supported golf bag open into a rearwardly and laterally extended tripod configuration for supporting the golf bag, and which wheel-supporting legs also close upon the golf bag to provide a compact storage condition. In all known prior art golf cart-golf bag combinations, the semi-circular rear golf bag portion is supported in a conforming semi-circular cradle or the like attached transversely of the longitudinal body of the cart and a separate, rearwardly-extending bracket or the like is provided for supporting the leg-opening mechanism. In these prior art constructions the storage position of the legs and, of course, the wheels supported thereon, are necessarily in extended positions rearwardly of the golf bag which, according to the present invention, are recognized as increasing the space requirement for storage.

Broadly, it is an object of the present invention to provide a golf bag pull cart overcoming the foregoing and other shortcomings of the prior art. More particularly, it is an object to support both the golf bag and the leg-opening mechanism so as to contribute to an optimum small-size storage condition of the combination.

As will be better understood from the subsequent detailed description, underlying the present invention is the recognition that better advantageous use can be made of the semi-circular rear golf bag shape than has heretofore occurred. More particularly, the referenced shape dictates a conforming shape in concave facing relation thereto to provide stable support for the golf bag on the golf cart, particularly, of course, during play. In sharp contrast to the prior art, in accordance with the present invention, a single structural component, rather than a separate cradle and a separate leg-supporting bracket, is provided, namely that herein denominated a leg-supporting bracket, to support in underlying relation from the rear the rear golf bag portion. The referenced bracket is similarly semi-circularly shaped and is disposed in a concave facing or encircling relation about the rear golf bag portion, thus serving the intended support function.

Additionally, and primarily constituting the within patentable advance, it has been recognized that the opposite ends of the bracket are, by virtue of their location forward of the rear golf bag portion, in advantageous locations for mounting the upper ends of the wheel-supporting legs for at least two reasons. First, the bracket end locations at which the legs are mounted for pivotal traverses into their opened and closed positions of movement provide pivotal traverse planes that meet the operating mode requirement of being rearward and lateral of the golf bag for providing tripod support thereof. Second, in the non-use condition of the legs in which they suspend vertically of the leg-supporting bracket, the leg-supported wheels are in forward locations positioned almost entirely within the width of the golf bag, and coincidentally thus having nominal rear wheel portions extending rearwardly behind the golf bag, all to the end of contributing to an optimum compact storage condition of the golf bag-pull cart device.

The description of the invention which follows, together with the accompanying drawings, should not be construed as limiting the invention to the example shown and described, because those skilled in the art to which this invention appertains will be able to devise other forms thereof within the ambit of the appended claims.

FIG. 1 is a side elevational view of a prior art golf bag pull cart;

FIG. 2 is a similar perspective view to FIG. 1 but of the within inventive golf bag pull cart for comparison with FIG. 1 to better demonstrate the structural differences therebetween;

FIG. 3 is a rear elevational view of the pull cart of FIG. 2, with the golf bag positioned thereon;

FIG. 4 is a side elevational view of the golf bag and pull cart combination illustrating, as does prior FIG. 3, the storage or non-use position of the wheels of the pull cart.

Figure 5A:
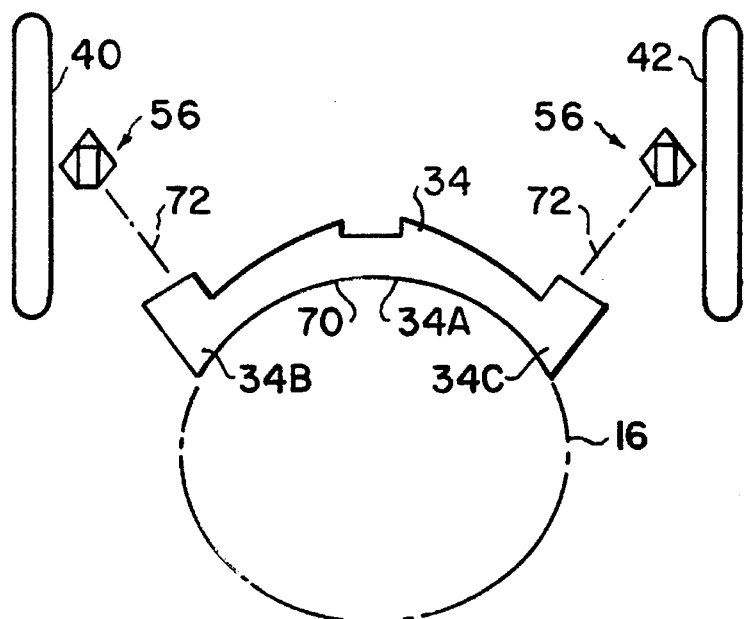
FIGS. 5A, 5B and 5C are simplified schematic views illustrating the positions of movement of the pull cart wheels in assuming their storage position of FIG. 4.

The improvements embodied by the combination golf bag and pull cart of the within invention is best understood by comparison with the "Golf Cart" of prior U.S. Pat. No. 3,459,434 issued to Dulaney on Aug. 5, 1969, shown in FIG. 1, and which by this reference will be understood to be incorporated herein in its entirety. Using the reference numerals of Dulaney, the disclosed golf bag pull cart will be understood to be of the type having a foot 32 for supporting a golf bag positioned along reference line A against a body frame 30, to which at pivot 104 a pivotal traverse of a pull handle 108 actuates legs 44, 46 with cooperating wheel 64 on the one side illustrated in FIG. 1 and cooperating opposite side wheel-mounting legs 48, 50 (not shown) into rearwardly and laterally straddling positions well understood to permit pulling the golf bag over the terrain of the golf course. Also well understood is the leg-opening and leg-closing operative linkage means 84 interconnected to the pivotally mounted pull handle 108 effective to respectively produce leg-opening movement and the wheel positions illustrated in FIG. 1 when the pull handle 108 is in its raised illustrated position, and leg-closing movement when the pull handle 108 is in its closed position against the body frame 30. Also incorporated herein in its entirety by reference is U.S. Pat. No. 5,143,399 for "Golf Cart" issued to Liu on Sep. 1, 1992 which illustrates wheel-supporting legs that open and close responsive to pivotal traverses of the golf cart handle, and numerous other patents in PTO Class 280, subclasses 645, 646, 47.18, 47.24 and 47.26.

Still referring to the prior art depicted in FIG. 1, it is to be particularly noted that the wheel-supporting legs 44, 46 (and 48, 50) will, when closed and suspended in a vertical orientation, lie in a reference plane B which is located a distance C rearwardly of the golf bag position A. This is a consequence of the leg-supporting bracket 34, i.e. the structural component attached at 33 to frame 30 to which the legs 44 and 46 are pivotally attached at 36, 38, having a semi-circular shape (Dulaney FIG. 11) and being oriented in convex relation to the golf bag A.

In sharp contrast, the within inventive combination golf bag-pull cart, generally designated 10 in the side-by-side comparison FIG. 2, and using the same reference numerals for FIG. 2 to demonstrate the differences by said comparison, includes, as shown in FIG. 3, a golf bag 12 having a compartment 14 bounded by a circular wall 16 for golf clubs which bag, during use, occupies a position on the pull cart 18 in the plane A. Also to be noted at this point in the description is the vertically closed wheel-supporting leg plane position at plane B. Unlike FIG. 1, the leg position B is a distance C that is forward, not rearward, of the bag position A. This is a consequence of the leg-supporting bracket 34 (see also FIG. 4), also of a semi-circular shape, being oriented in a concave, rather than in a convex, facing relation to the bag position A.

The significance of the foregoing differences, and underlying the present invention, is the recognition that in the closed wheel position the wheels being forward of the bag position plane A at plane B in their position adjacent the side of the golf bag in a correspondingly forward position, as best shown in FIG. 4, contribute to providing an optimum compact storage condition for the combination golf bag-pull cart 10. This greatly facilitates storage of the combination 10 and obviates having to detach the golf bag 12 from the pull cart 18, facilitates handling during inserting and removing the combination 10 from an auto trunk, and results in other significant benefits.

Figure 5B:
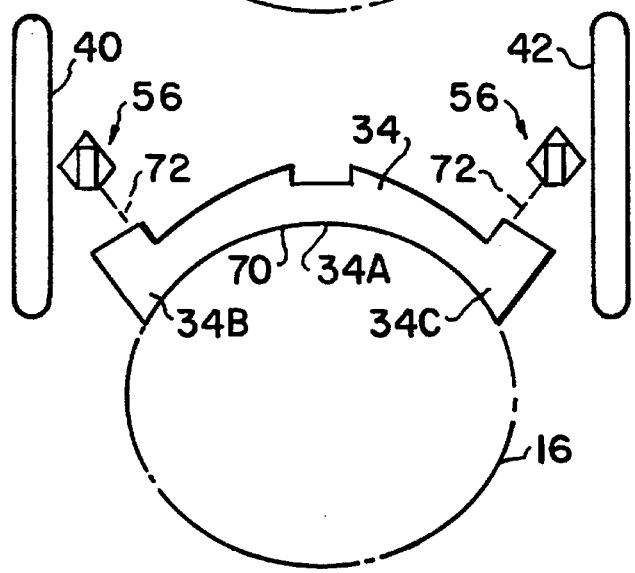
Figure 5C:
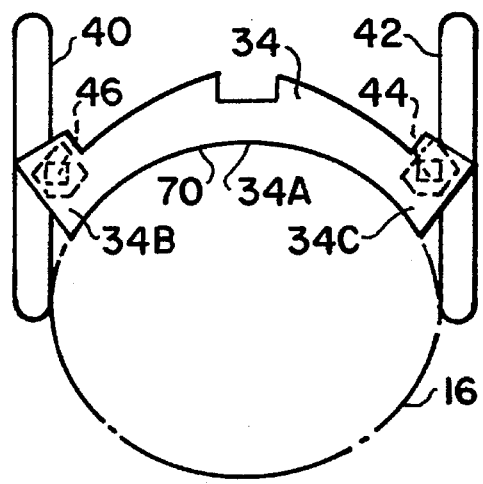

While it is believed that the invention is readily understood from the foregoing description, for completeness' sake the description proceeds in specific reference to FIGS. 2–5. As may be best understood from FIGS. 2, 3 and 4 and, as already noted, the within golf bag and pull cart combination 10 is of the type having an operating mode in which a pivotal traverse about pivot 104 at the upper end of the cart body or frame 30 of handle 108 is operatively effective through links 20 and 22 connected at opposite ends at 24 and 26 in spanning relation between the handle and each of the legs 44 and 46 to provide the storage and in-use positions of the wheels 40 and 42, in the well understood manner exemplified, for example, by the prior art cart of FIG. 1.

Reference should be made specifically to the side elevational view of FIG. 4 in which wheel 40 is in phantom perspective so as not to obscure the structural details of the connection at 52 of the leg mechanism, generally designated 54, to the wheel 40, being the same for wheel 42, but not shown in FIG. 4. More particularly, during a pivotal traverse of the wheels 40 and 42 caused by lifting movement of the handle 108, the wheel traverse direction is clockwise as viewed in FIG. 4, which changes the starting vertical orientation of a bracket 56 in which the wheel axle will be understood to be supported at 58 and on which axle the wheel 40 is journalled for rotation, to a radial orientation or extension of the leg 44. However, link 60 of the wheel operating mechanism being connected at opposite ends at 62 and 63 between the main leg-supporting upper bracket 34 and said lower bracket 56 is effective in causing a countering translating rotation, which is counterclockwise, in bracket 56 about pivot 66, which maintains the vertical orientation of bracket 56 and which is use has been found to promote better wheeling service of the wheels 40 and 42 over bumps and undulations of the golf course terrain.

Still referring to FIG. 4, it should be readily apparent that the plane B of the storage positions of the wheels 40 and 42 being forward the distance C of the bag position plane A contribute to correspondingly forward wheel positions on opposite sides of the rear bag portion 13 of the golf bag 12, and this is due in significant extent to the conforming semi-circular shapes of the bag portion 13 and the facing surface of the bracket 34.

Reference should additionally be made to the simplified schematic views 5A, 5B and 5C which illustrate the conforming semi-circular shapes at 70, and also illustrate in sequence the closing positions of movement of the wheels 40 and 42 in the pivotal traverse planes 72 in relation to the golf bag 12.

In summary, from the preceding description, it should be readily appreciated that the concave relation of a semi-circular inner surface 34A of the bracket 34 relative to the similarly shaped rear golf bag portion 13 positions the former in encircling relation about the latter such that the opposite bracket ends 34B and 34C are in the strategic forward positions in the plane denoted by the reference B to support the pivots 36, 38 for vertically suspending the wheel-mounting legs 44 and 46 almost entirely within the width dimension of the golf bag 12, all as is best illustrated in FIG. 4. Additionally, the pivots 36, 38 in bracket opposite ends 34B and 34C for the legs 44 and 46 readily provide a plane of pivotal traverse 72 which is substantially perpendicular of these bracket ends and thus each opening leg path of movement is, as it is required to be, rearwardly and laterally outwardly of the golf bag 12 to thereby provide stable support for the golf bag 12.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In combination, a golf bag of a type having a bottom and a compartment for golf clubs bounded by a circular wall with a semi-circular rear portion, and an improved golf bag pull cart of a type having pair of legs each having opposite proximal and distal ends of which said distal ends bound a bag-receiving clearance therebetween and have attached thereto wheels and of which said proximal ends are each pivotally mounted to partake of a pivotal traverse from a non-use position adjacent said golf bag into a golf bag-supporting position extending rearwardly and laterally outwardly of said golf bag, said pull cart improvements comprising a body for said cart having an operative position disposed in longitudinal alignment with said golf bag semi-circular rear wall portion, a semi-circular leg-supporting bracket with opposite ends mounted in transverse relation on said body in encircling relation about said golf bag with said bracket opposite ends positioned forwardly of said golf bag rear wall portion, pivots, for each leg each operatively disposed in a leg-supporting bracket opposite end for defining a plane of pivotal traverse of a cooperating leg perpendicularly of said bracket end and correspondingly rearwardly and laterally outwardly of said golf bag, and link means, for supporting each leg and positioned by said proximal ends thereof from a cooperating pivot so as to suspend each leg in vertical relation externally of and adjacent said golf bag in said non-use position, said golf bag bottom having an operative position protected within said bag-receiving clearance between said distal ends of said legs contributing to a compact condition of said cart of said golf bag in said non-use position thereof.

\* \* \* \* \*